United States Patent
Ferrentino

(10) Patent No.: US 10,098,322 B2
(45) Date of Patent: Oct. 16, 2018

(54) PET GROOMING APPLIANCE

(71) Applicant: FERROLINO PTY LTD, Wollert, Victoria (AU)

(72) Inventor: Rocco Ferrentino, Wallan (AU)

(73) Assignee: Ferrolino PTY LTD, Wollert, Victoria (AU)

( * ) Notice: Subject to any disclaimer, the term of this patent is extended or adjusted under 35 U.S.C. 154(b) by 32 days.

(21) Appl. No.: 14/428,294

(22) PCT Filed: Sep. 10, 2013

(86) PCT No.: PCT/AU2013/001027
§ 371 (c)(1),
(2) Date: Mar. 13, 2015

(87) PCT Pub. No.: WO2014/040121
PCT Pub. Date: Mar. 20, 2014

(65) Prior Publication Data
US 2015/0250141 A1 Sep. 10, 2015

(30) Foreign Application Priority Data
Sep. 13, 2012 (AU) .................................. 2012903990

(51) Int. Cl.
*A01K 13/00* (2006.01)
*A47L 9/06* (2006.01)
(Continued)

(52) U.S. Cl.
CPC ............ *A01K 13/002* (2013.01); *A45D 24/32* (2013.01); *A47L 9/06* (2013.01); *A47L 9/2857* (2013.01); *B26B 19/24* (2013.01); *B26B 19/44* (2013.01)

(58) Field of Classification Search
CPC ..... A01K 13/002; A01K 13/00; A01K 13/001
(Continued)

(56) References Cited

U.S. PATENT DOCUMENTS 2,228,091 A * 1/1941 Smith .................... A45D 24/32
132/112
2,367,437 A 1/1945 Salt
(Continued)

FOREIGN PATENT DOCUMENTS

AU 66775/86 A 6/1987
GB 2470408 A 11/2010
(Continued)

OTHER PUBLICATIONS

International Search Report dated Dec. 10, 2013 for corresponding International Patent Application PCT/AU2013/001027, filed Sep. 10, 2013.
(Continued)

*Primary Examiner* — Kimberley S Wright
(74) *Attorney, Agent, or Firm* — David D. Brush; Westman, Champlin & Koehler, PA

(57) ABSTRACT

An appliance for grooming furred animals including a tubular body part forming a handle and an airflow duct connectable to a vacuum cleaner, the distal end of the body part being flared out to form a head part communicating with the airflow duct; a comb assembly being pivotally supported from the forward edge of the opening of the head part with a comb orientated more or less normal to the longitudinal axis of the body part or tilted towards a user of the appliance to make an angle with the longitudinal axis of the body part in the range 90 to 60 degrees; the comb assembly being pivotally displaceable by various means inwardly from its the deployed position into a retracted position within the head part where the comb is exposed to and swept by airflow generated by the vacuum cleaner, thereby removing accumulated hair.

23 Claims, 9 Drawing Sheets

(51) Int. Cl.
*A45D 24/32* (2006.01)
*A47L 9/28* (2006.01)
*B26B 19/24* (2006.01)
*B26B 19/44* (2006.01)

(58) Field of Classification Search
USPC .................. 119/613, 614, 625, 626, 628
See application file for complete search history.

(56) References Cited

U.S. PATENT DOCUMENTS

| | | | | |
|---|---|---|---|---|
| 2,953,808 A * | 9/1960 | Carmack | ................ | A45D 24/32 132/125 |
| 3,308,500 A | 3/1967 | Woodruff | | |
| 3,626,546 A * | 12/1971 | Dove | ................ | A01K 13/002 15/373 |
| 3,668,736 A * | 6/1972 | Loscalzo | ................ | A47L 9/06 15/347 |
| 3,815,171 A * | 6/1974 | Carr | ................ | A47L 9/02 15/369 |
| 3,894,308 A * | 7/1975 | Carr | ................ | A47L 9/02 15/369 |
| 3,981,275 A | 9/1976 | Schimoler | | |
| 4,630,329 A * | 12/1986 | Shores | ................ | A01K 13/002 15/352 |
| 4,779,572 A * | 10/1988 | Freulon | ................ | A01K 13/002 119/604 |
| 5,088,199 A * | 2/1992 | Romani | ................ | B26B 19/44 30/132 |
| 5,095,853 A * | 3/1992 | Kruger | ................ | A01K 13/002 119/606 |
| 5,211,131 A | 5/1993 | Plyler | | |
| 5,231,762 A | 8/1993 | Hunts | | |
| 5,462,018 A * | 10/1995 | Louison | ................ | A01K 13/002 119/626 |
| 5,495,636 A | 3/1996 | Dekker et al. | | |
| 5,768,748 A | 6/1998 | Silvera et al. | | |
| 5,862,563 A | 1/1999 | Hartmann | | |
| 5,881,462 A * | 3/1999 | Romani | ................ | B26B 19/44 30/133 |
| 6,427,633 B1 | 8/2002 | Ogden | | |
| 6,681,775 B2 | 1/2004 | Wang | | |
| 6,925,728 B2 * | 8/2005 | Busa | ................ | A45D 20/50 34/92 |
| 6,935,028 B2 | 8/2005 | Cutting | | |
| 7,509,926 B2 | 3/2009 | Porter et al. | | |
| 7,963,253 B1 * | 6/2011 | Bauknecht | ................ | A01K 13/002 119/600 |
| 8,060,967 B1 | 11/2011 | Johnson, Jr. | | |
| 9,010,276 B1 * | 4/2015 | Nevitt | ................ | A45D 24/32 119/611 |
| 2007/0084416 A1 * | 4/2007 | Liao | ................ | A01K 13/002 119/625 |
| 2009/0101076 A1 * | 4/2009 | Khubani | ................ | A01K 13/002 119/611 |
| 2010/0294208 A1 * | 11/2010 | Dyson | ................ | A01K 13/00 119/611 |
| 2011/0030620 A1 | 2/2011 | Jouan | | |
| 2013/0145992 A1 * | 6/2013 | Liang | ................ | A47L 7/0066 119/608 |

FOREIGN PATENT DOCUMENTS

JP  2001000068 A * 1/2001
WO  2006114852 A2  11/2006

OTHER PUBLICATIONS

Written Opinion dated Mar. 13, 2015 for corresponding International Patent Application PCT/AU2013/001027, filed Sep. 10, 2013.

* cited by examiner

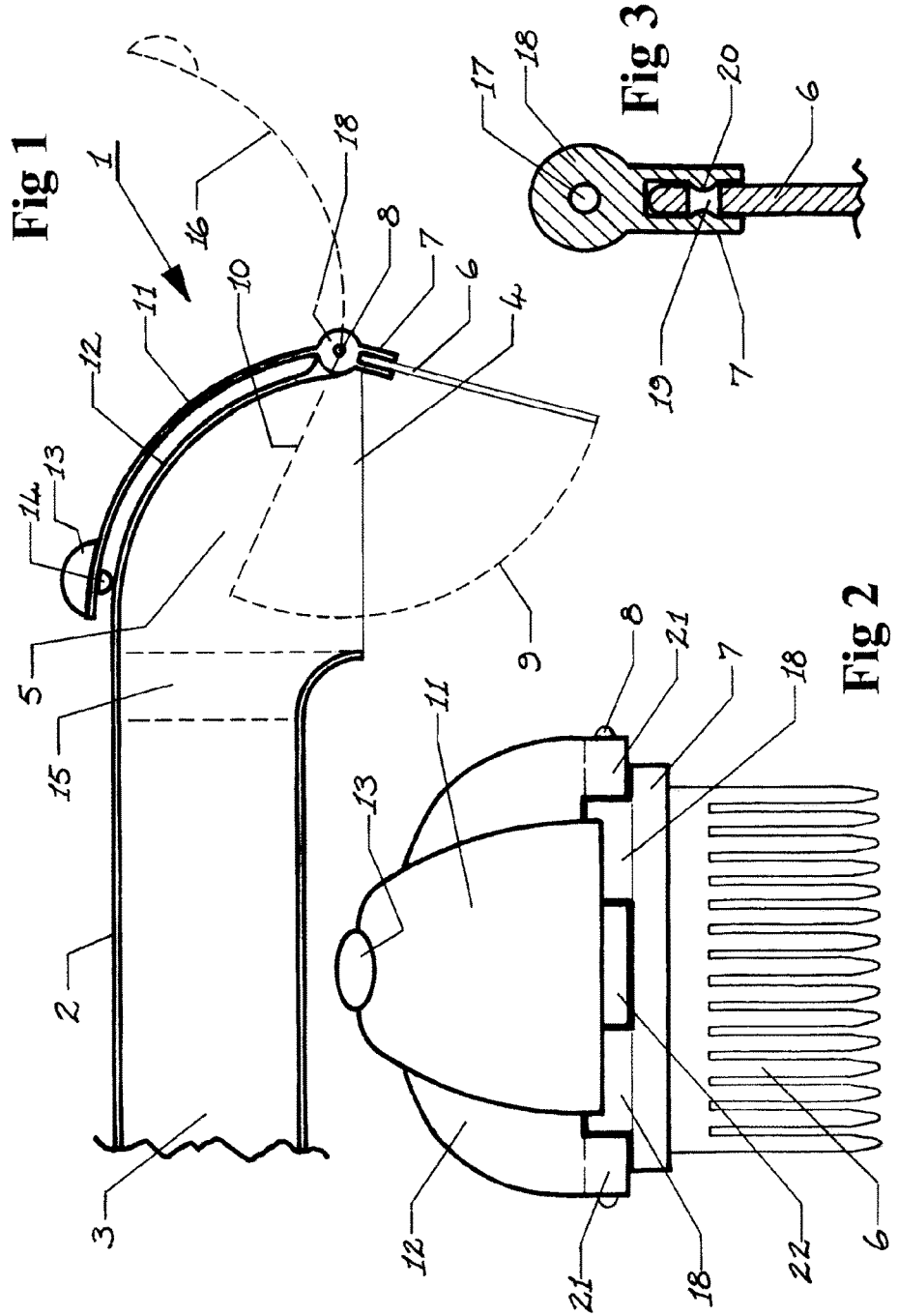

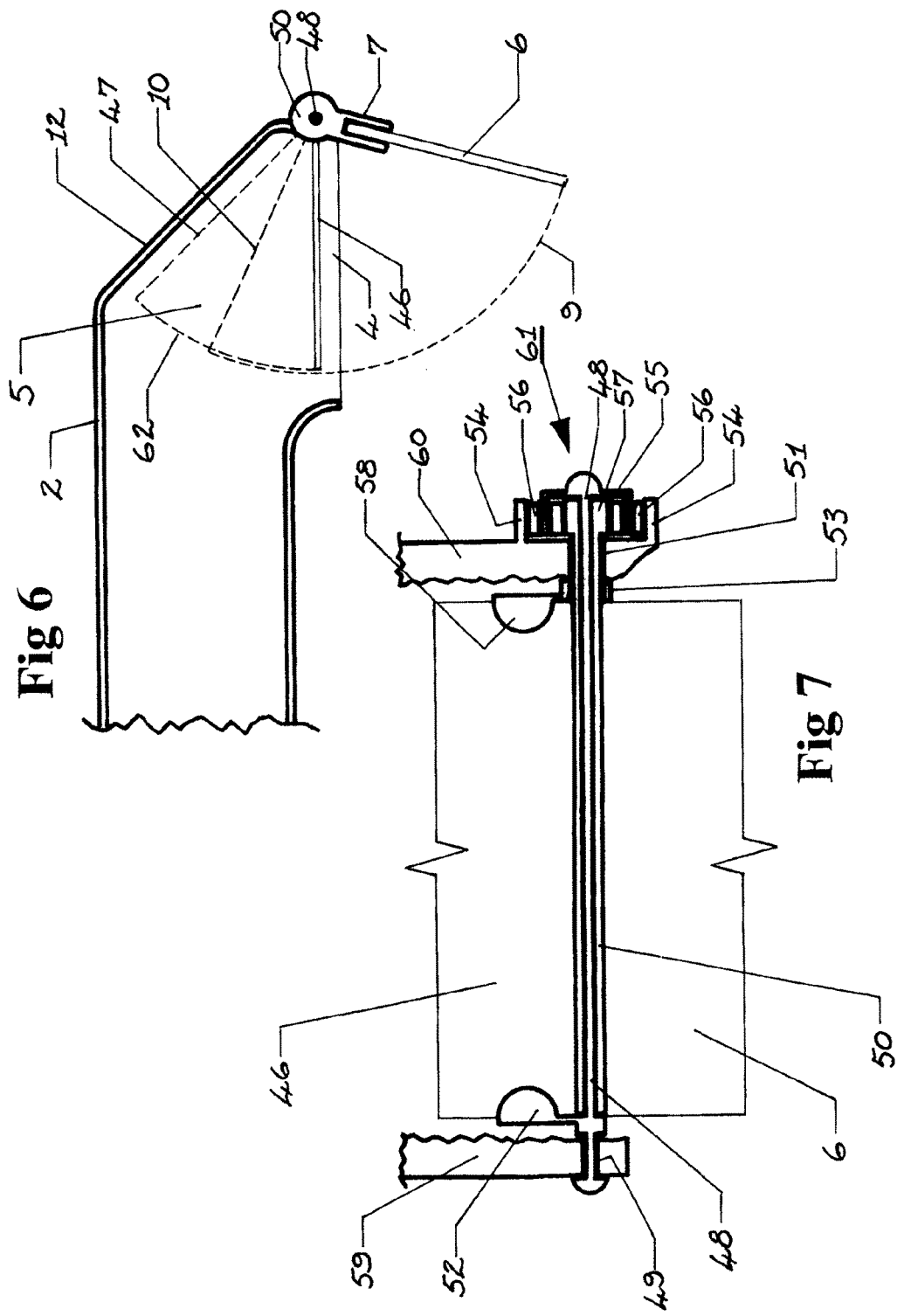

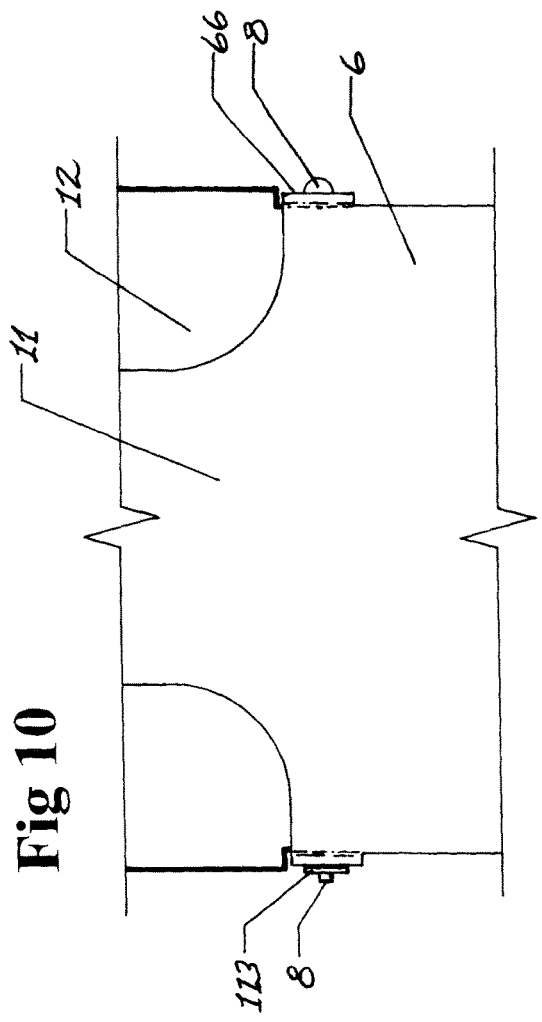
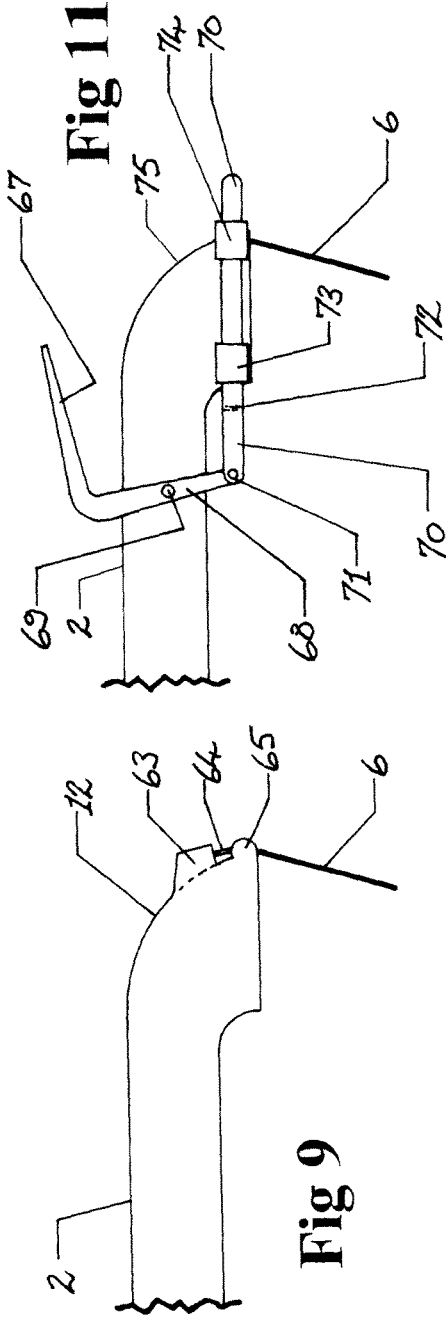
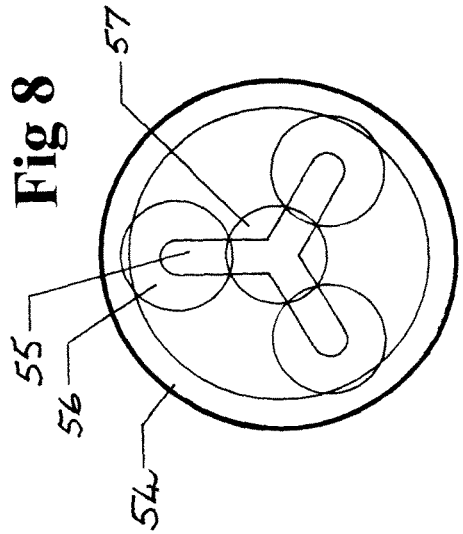

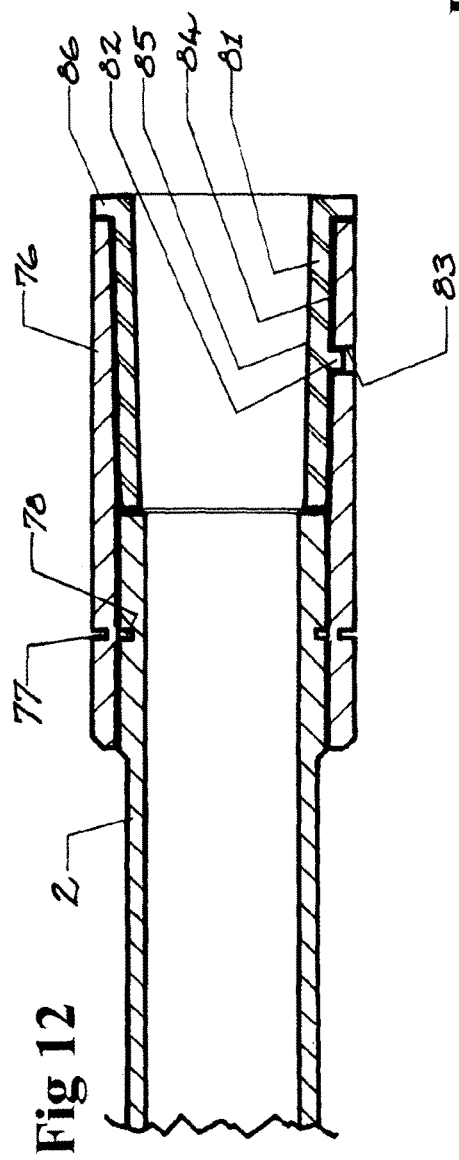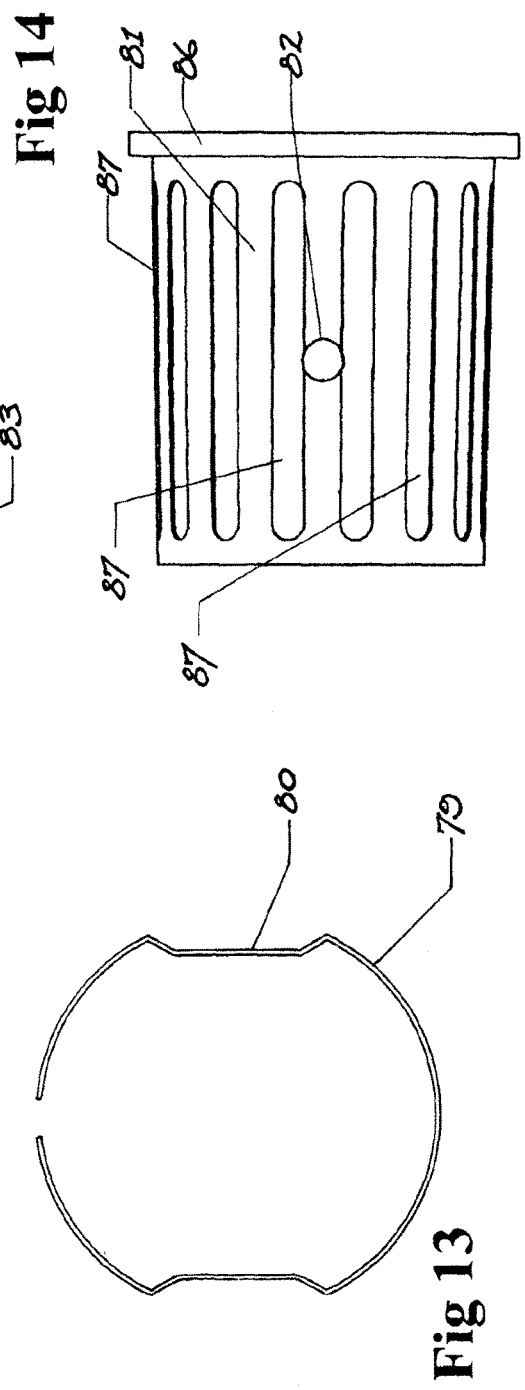

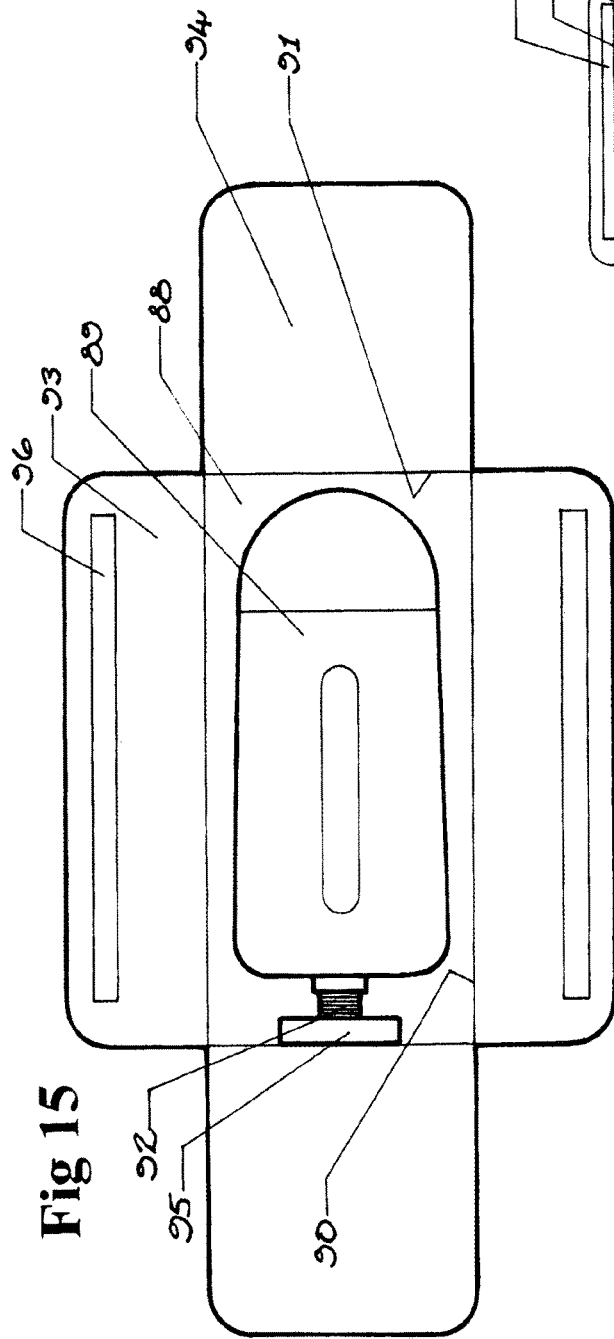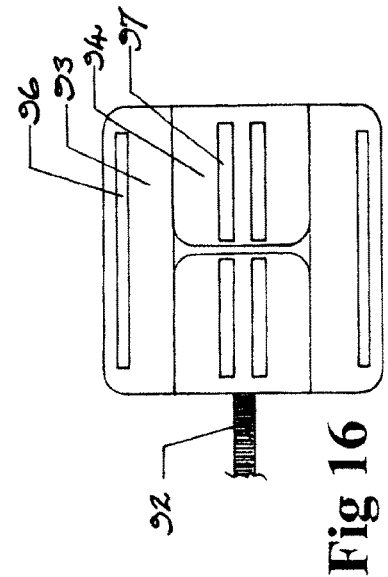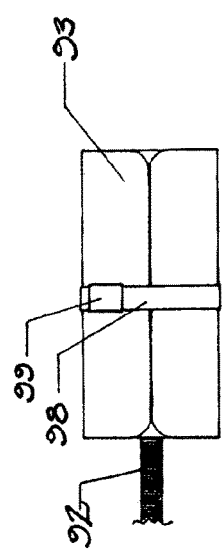
Fig 15
Fig 16
Fig 17

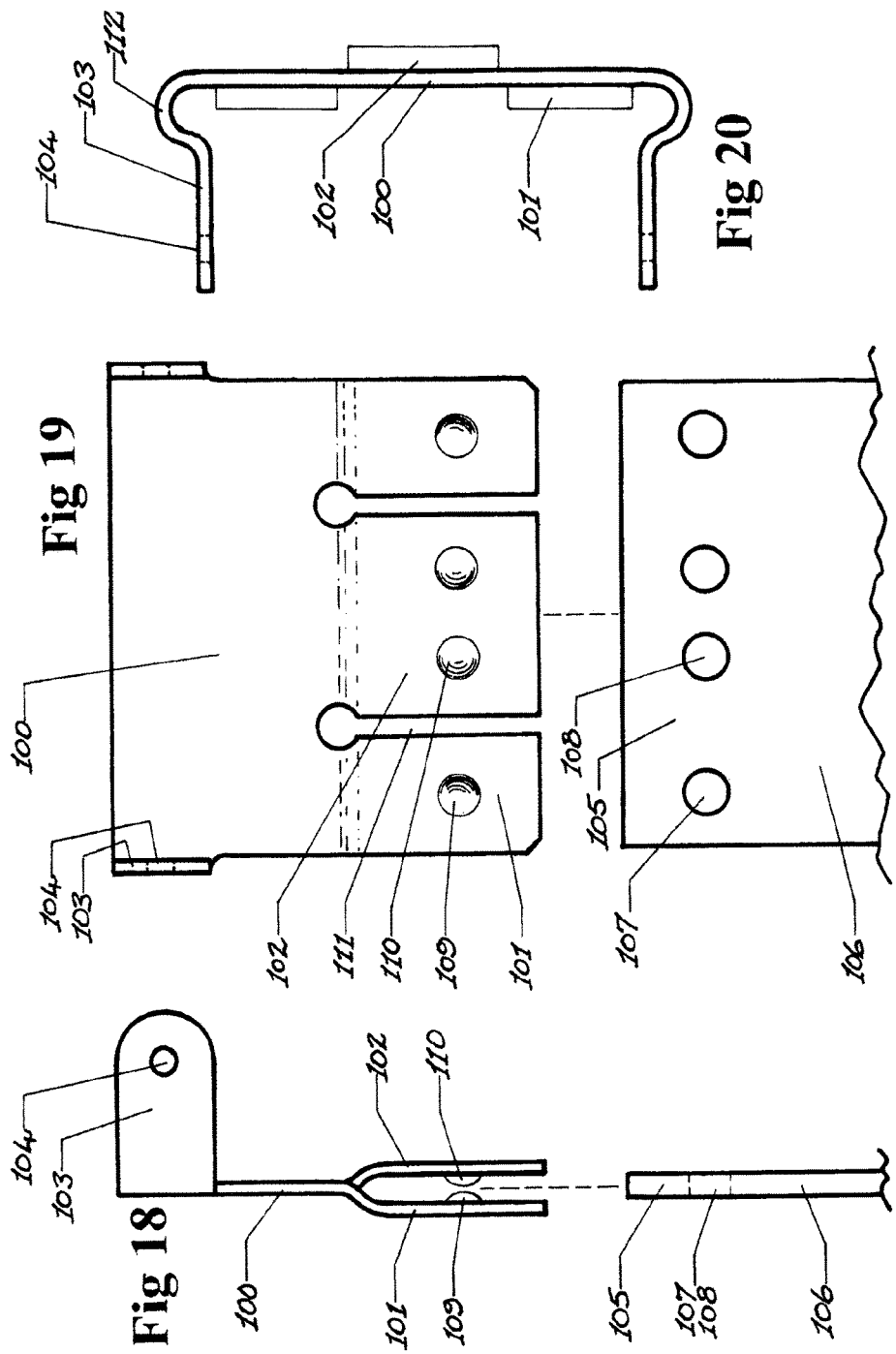

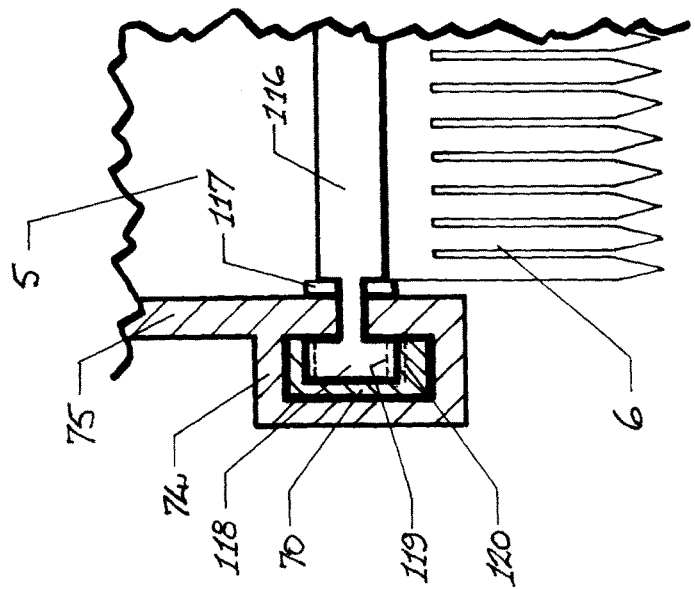
Fig 23
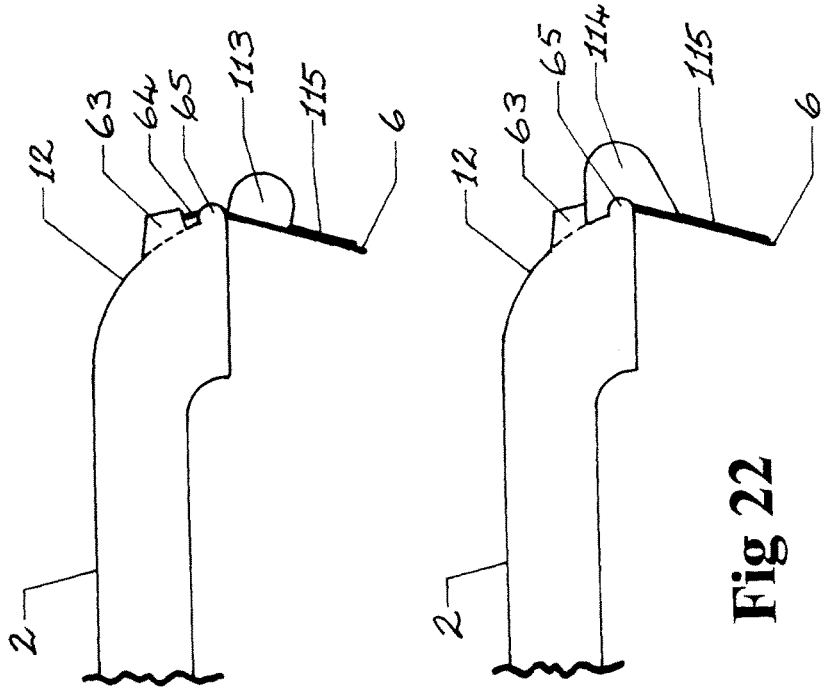
Fig 21
Fig 22

PET GROOMING APPLIANCE

CROSS REFERENCE TO RELATED APPLICATIONS

The present application is based on and claims the benefit of Australian provisional patent application Ser. No. 2012903990, filed Sep. 13, 2012, the content of which is hereby incorporated by reference in its entirety.

The present application is a Section 371 National Stage Application of International Application No. PCT/AU2013/001027, filed Sep. 10, 2013, which is incorporated by reference in its entirety and published as WO 2014/040121 A1 on Mar. 20, 2014, in English.

This invention relates generally to appliances for the grooming the coats of furred animals, involving the removal of loose hair and fur by combing. More particularly, it relates to such appliances which are combined with a vacuum cleaning unit to suck away and capture loose hair or fur collected during the grooming process.

The hair or fur of animals commonly has several discrete layers: ground hair, a dense, woolly, inner layer to provide thermal insulation, the ground hair; an outer layer of longer, often coarse, straight hair that protects the ground hair, the guard hair; and, in some species, an intermediate layer of awn hair. The principal function of the ground hair is thermoregulation. In animal species adapted to cold climates, the ground hair grows with the onset of cold weather and, when warmer weather returns, it is moulted. In domesticated species, the moulted ground hair is removed by grooming, using a comb-type appliance. Such appliances comprise a handle part and a comb part, the comb part being provided with a plurality of teeth, the characteristics of which are dependent upon the species and type of animal to be groomed. In use, the teeth of the comb part of the appliance are drawn through the coat of an animal and loose hair or fur is collected therein. In the typical, simple grooming appliance, the collected hair or fur is manually removed from the comb part and discarded.

In use, a typical grooming device often rapidly becomes filled with collected hair. Unless this is removed on a regular basis, the hair becomes matted and intractable. A typical pet grooming tool is that taught by Porter et al in U.S. Pat. No. 7,509,926. This invention comprises a handle portion and a pet engageable portion including a blade with a plurality of teeth. The invention is concerned primarily with the characteristics and method of employment of the pet engageable portion. A number of methods of removing collected hair from grooming devices have been invented. An example is the pet brush with hair removal feature taught by Ogden in U.S. Pat. No. 6,427,633. In this invention, a plurality of bristles is fixed to a body, passing out through apertures in a cleaning element plate. Spring means are provided to urge the cleaning element plate into abutment with the body. When hair has accumulated in the bristles, a control element on the handle and connected to the cleaning element plate is pushed, displacing the cleaning element plate away from the body and, thereby, displacing the hair from the bristles. In another example taught by Hartmann in U.S. Pat. No. 5,862,563, a brush is made with a flexible membrane having a plurality of bristles attached to it, the bristles passing out through apertures in a cleaning plate. Spring means are employed to urge the flexible membrane outwardly to deploy the bristles. When hair has accumulated in the bristles, a button is pressed to depress the flexible membrane against the urging of the spring means, withdrawing the bristles in through the apertures in the cleaning plate and, thereby, displacing the hair from the bristles. In the brush provided with retractable bristles taught by Wang in U.S. Pat. No. 6,681,775, a bristle-holding element is disposed movably in a bristle-receiving chamber, a plurality of bristles mounted on the bristle-holding element extending out through bristle-extension apertures in a combing wall, an urging member in the bristle-receiving chamber urging the bristle-holding element toward the combing wall of the brush body to deploy the bristles. An operating member is connected to the bristle-holding element to move the bristle-holding element against the urging action of the urging member away from the combing wall of the brush body. When hair has accumulated in the bristles, the operating member is operated, withdrawing the bristles through the apertures in the combing wall and, thereby, displacing the hair from the bristles. Animal grooming tools incorporating clippers are common, an example being the dog grooming tool taught by Schimoler in U.S. Pat. No. 3,981,275. In another grooming attachment taught by Hunts in U.S. Pat. No. 5,231,762, an array of horizontal tynes has a flow chamber connected to a vacuum cleaner situated immediately above it, a set of cutting blades being provided in the flow chamber. In use, the tynes are passed through the fur of an animal which, being lifted, is drawn into the flow chamber where it may be cut by the cutting blades, the arrangement minimising the possibility of injury to an animal. The pet grooming device taught by Plyler in U.S. Pat. No. 5,211,131 includes a vacuum system for inducing fleas, ticks, loose hair and other debris from an animal such as a cat or dog during a grooming exercise. The grooming device has a plurality of individually spaced bristles which project from the front of the grooming head and act to massage and stimulate the hair and skin of an animal during the grooming process. The head of the device incorporates a fan driven by an electric motor, the fan drawing a flow of air in past the bristles and through a collection bag in which fleas, ticks, loose hair dust and other matter from the groomed animal are collected. In another example taught by Ireland et al in GB 2470408, a grooming device attachment for a vacuum cleaner comprises a head and a handle connected to the head, the head comprising a bristle carrier having a plurality of bristles and a bristle cover having a plurality of apertures. The handle comprises an actuator manually operable by a user to effect relative movement between the bristle carrier and the bristle cover from a stowed configuration in which the bristles are retracted relative to the bristle cover and a deployed configuration in which the bristles protrude from the bristle cover through the apertures. Resilient members are provided for returning the head to the stowed configuration automatically when the actuator is released by the user. In addition to enabling hair or other matter collected between the bristles of the bristle carrier to be readily dislodged from the device, the automatic retraction of the bristles beneath the bristle cover can ensure that the bristles are not exposed when the grooming device is not in use. The grooming device can be connected to a vacuum cleaner and can be used to groom animals and pets, retraction of the bristles through the bristle cover allowing collected hair and other material to be drawn into a suction opening in the head and carried away to a vacuum cleaner.

The pet grooming tool of Porter et al is typical of those in which hair accumulates during grooming and must be regularly removed. In the self-cleaning-type brushes taught by Ogden, Hartmann and Wang, although accumulated hair is dislodged from the bristles, it must be then taken away manually. This requires the use of the second hand that is normally employed to restrain an animal during grooming.

Further, displaced hair may fall to the floor before it can be caught and may then constitute a safety and health hazard. In the grooming tool of Schimoler, cut hair cannot be intercepted or collected and simply falls to the floor. The grooming attachment of Hunts does positively collect cut hair, but is primarily a hair cutting device, not a hair collecting device. Further, where loose hair is present, the horizontal tynes of this invention would collect detached hair in a way that would prevent its being drawn away into the flow chamber, necessitating regular manual removal. The grooming device of Plyler does capture loose hair and has provision to draw it away by means of air flow into a collection bag. However, the nature of the bristles of the device is such as to collect a large proportion of dislodged hair. This will then not be drawn into the collection bag and will have to be removed regularly by manual means. Moreover, where an animal is moulting, the collection bag will rapidly be filled and, unless emptied regularly, will impede airflow through the bag with a marked diminution in collection performance. While the grooming device of Ireland et al does positively displace collected hair from its bristles and does have provision to carry displaced hair away to a vacuum cleaner, the broad, flat shaping of the head of the device with a centrally located suction opening constitutes an inefficient configuration for collection purposes, requiring a very powerful flow of air for its successful operation.

The object of the present invention is to provide a pet grooming appliance which is light, simple and inexpensive; which may be operated in a simple and easy way to positively remove hair accumulated during grooming; which will operate with minimal collection airflow; which will accommodate combs of a variety of configurations; which may be adapted to cut and collect hair; which may be employed to remotely control an associated vacuum cleaner; and which may optionally incorporate a rotary grooming brush.

According to the present invention, a pet grooming appliance comprises a body part forming a handle and incorporating an airflow duct able to be connected to a vacuum cleaner. The distal end of the body part is formed into a head which communicates with the airflow duct, but is substantially expanded and turned through an angle of approximately 90 degrees to provide a working opening communicating with an atrium. Pivotally supported from the forward edge of the working opening is a comb assembly which projects outwardly and, in its deployed position, is orientated more or less normal to the axis of the body part. The comb assembly may be pivoted inwardly from its deployed position to retract the comb into the atrium of the appliance. Extended to its deployed position, the comb assembly abuts stops which prevent further displacement of the comb as a result of grooming forces applied to it. Retraction of the comb into the atrium of the appliance may be effected in a number of ways. In the retracted position of the comb, airflow generated by a vacuum cleaner connected to the body part strips collected hair from the comb and carries it away. The vacuum cleaner is optionally operated continuously or is optionally remotely controlled from the appliance. Combs of a variety of configurations are quickly and easily installed in the appliance. Hair cutting devices and a rotary grooming brush are optionally incorporated into the appliance.

The various aspects of the present invention will be more readily understood by reference to the following description of preferred embodiments given in relation to the accompanying drawings in which:

FIG. 1 is a longitudinal cross-sectional view of a first embodiment of the present invention (part-cylindrical pivot member of comb carrier depicted as being located on centre-line);

FIG. 2 is an end view of the embodiment of FIG. 1;

FIG. 3 is a fragmentary, cross-sectional view of the point of attachment of a comb to its comb carrier;

FIG. 6 is a longitudinal cross-sectional view of a fourth embodiment of the present invention;

FIG. 7 is a schematic, transverse cross-sectional view of the comb retraction mechanism of the embodiment of FIG. 6 (vane depicted out of place for illustrative simplicity);

FIG. 8 is a schematic face view of an epicyclic gearing arrangement of the mechanism of FIG. 7;

FIG. 9 is a side view of a fifth embodiment of the present invention;

FIG. 10 is a fragmentary end view of an alternative embodiment of the comb pivot provisions of the present invention;

FIG. 11 is a side view of a sixth embodiment of the present invention;

FIG. 12 is a partial longitudinal cross-sectional view showing a swivelling connection of the present invention;

FIG. 13 is a face view of a wire retaining clip for the swivelling connection of FIG. 12;

FIG. 14 is a side view of an elastomeric insert for the swivelling connection of FIG. 12;

FIG. 15 is a view from above of a sound attenuating enclosure for a vacuum cleaner employed with the present invention;

FIG. 16 is a view from above of the sound attenuating enclosure of FIG. 15 in its partially closed state;

FIG. 17 is a view from above of the sound attenuating enclosure of FIG. 15 in its fully closed state;

FIG. 18 is an exploded side view of a comb carrier of an alternative embodiment of the present invention;

FIG. 19 is an exploded end view of the comb carrier of FIG. 18;

Figure 4:
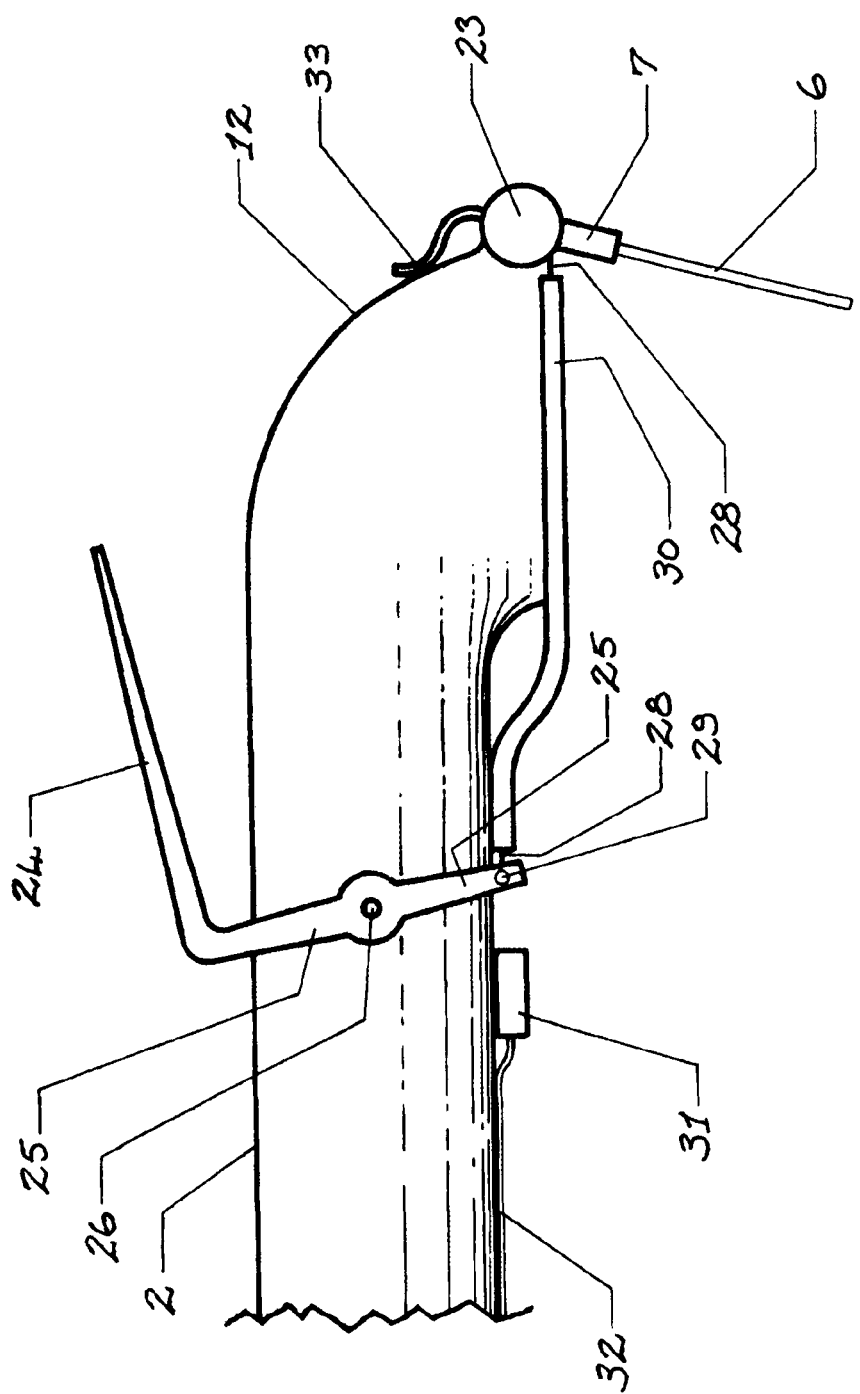
FIG. 4 is a is a side view of a second embodiment of the present invention.

FIG. 20 a view from above of an alternative embodiment of the comb carrier of FIG. 18.

FIG. 21 is a side view of another embodiment of the present invention in which an electrically-driven cutter is incorporated into the comb;

FIG. 22 is a side view of a further embodiment of the present invention in which an electrically-driven cutter is incorporated into the comb;

FIG. 23 is fragmentary transverse cross-sectional view through the centre-line of the comb carrier of the invention.

With reference to FIG. 1, a pet grooming appliance 1 comprises a body part 2 forming a handle and incorporating an airflow duct 3 able to be connected to a vacuum cleaner (not shown). The distal end of the body part is flared out in zone 15 to form a head part which communicates with said airflow duct, but is substantially expanded and turned through an angle of approximately 90 degrees to provide a working opening 4 communicating with atrium 5. The sides of said head part are made flat, such that the internal cross-sectional shape of the outer part of said head part is more or less square or rectangular. Pivotally supported from the forward edge of said working opening is a comb assembly comprising comb 6 supported in comb carrier 7, said comb carrier being pivotally supported on shaft 8. Said comb projects outwardly and, in its deployed position, is orientated more or less normal to the axis of said body part or tilted towards the user of said appliance, making an angle with the longitudinal axis of said body part in the range 90 to 60 degrees. To remove accumulated hair from said comb, said comb assembly is pivotally displaced inwardly from its deployed position through arc 9 (indicated in broken line) to retract said comb into said atrium into position 10 (indicated in broken line) in which position said comb is swept by airflow entering said atrium generated by said vacuum cleaner. In an alternative embodiment (not shown) suitable apertures are provided in the lower part of the end surface 12 of said head part to admit a supplementary flow of air over said comb in its retracted position. In another alternative embodiment (not shown), an elongated door is provided along a substantial part of the width of the lower part of the end surface 12 of said head part, said door being pivotally supported on a transversely arranged hinge and urged by suitable light spring means to the closed position, displacement of said comb carrier causing one or more cams fixed to said comb carrier to open said door to admit a supplementary flow of air over said comb in its retracted position. Fixed to said comb carrier is stop arm 11 preferably shaped to follow the shape of the outer end surface 12 of said head part. In the preferred embodiment, the free end of said stop arm supports on its outer surface suitable weight 13 and on its inner surface snubber 14 made from a suitable resilient material. In an alternative embodiment (not shown), said snubber is fixed to the end of a threaded stem which is screwably displaced inwardly or outwardly to displace the free end of said stop arm inwardly or outwardly, thereby altering the angle made by the deployed said comb with the longitudinal axis of said body part. To displace said comb to its retracted position, said appliance is simply flicked sharply downwards in a short arc so that centrifugal force throws said stop arm outwardly to position 16 (indicated in broken line), said outward displacement of said stop arm being limited by the displaced said comb carrier abutting the lower edge of said head part. In an alternative embodiment (not shown), suitable stops are provided to limit the inward pivotal displacement of said comb carrier, said stops taking the form of lugs provided in appropriate positions on the side internal surfaces of said head part above the lower edge of said working opening.

During use of said appliance for grooming purposes, forces applied to said comb are transmitted via said comb carrier and thence via said stop arm to said snubber bearing against the outer end surface 12 of said head part. In an alternative embodiment (not shown), where the mass of said stop arm is sufficient, weight 13 is optionally deleted. Similarly, snubber 14 is optionally deleted, the inner surface of said stop arm simply abutting the outer end surface 12 of said head part. Where required, for example, where force is required to be applied for some reason to the outer face of said comb, an operator is able to retain said comb in its deployed position by applying thumb pressure to the free end of said stop arm.

With additional reference to FIG. 3, in alternative embodiments, said comb is made readily interchangeable in a variety of configurations for a variety of applications, differences between configurations including shaping of teeth, length of teeth, width of teeth, spacing of teeth and straightness or curvature of teeth. Where said comb is made interchangeable, its upper edge is made with suitable apertures or recesses 19 which engage complementary projections 20 provided within comb carrier 7 when said comb upper edge is seated in said comb carrier. In this embodiment, the two parts of said comb carrier are made sufficiently elastic to allow them to spring apart when said comb upper edge is forced between them. Obviously, said apertures or recesses may be provided in said comb carrier and said complementary projections in said comb upper edge.

With additional reference to FIG. 2, comb carrier 7 is formed on one or more moving, part-cylindrical pivot members 18 which are disposed between one or more fixed, part-cylindrical pivot members 21, 22 formed on the lower edge of outer end surface 12 of said head part, said moving pivot members being pivotally supported on shaft 8 passing through their bores 17 and fixed in complementary bores (not shown) in said fixed pivot members. In the preferred embodiment, the shaping of the outer end surface 12 of said head part conforms to the surface of a cylinder.

With reference to FIG. 4, said appliance is made with mechanical means employed to manually displace said comb into its retracted position. In this embodiment, suitable spring means are provided to displace said comb into its deployed position. Provided at one end of said comb carrier is a cable drum (not shown) enclosed at each end by circular flanges 23. Depression of finger bar 24 pivotally displaces lever arm 25 on pivot 26 causing cable 28 to be drawn through guide tube 30. The distal end of said cable is wound around said drum in the sense such that displacement of said cable by said lever arm causes said cable drum and said comb carrier to rotate and displace said comb into said atrium against the urging of said spring means. Releasing of said finger bar slackens said cable, permitting said spring means to restore said comb to its deployed position. In the preferred embodiment, said cable is provide at its proximal end with a short, rigid fitting terminating in a cylindrical slug 29 which is pivotally captured in suitable bores provided at the free end of said lever arm, said lever arm being locally bifurcated or folded over at that point. In an alternative embodiment (not shown), a suitable clevis fitting provided on the proximal end of said cable is pivotally connected to the free end of said level arm with a suitable pin. Also in the preferred embodiment, said cable takes, the form of a strong, smooth, braided, softly flexible cord made from aramid or similar material. Said guide tube takes the form of a rigid tube of metal or polymer material with a smooth bore, said guide tube preferably being fixed to said body part and said head part and shaped as required to pass from said body part around said head part. Fixed to said comb carrier is short stop arm 33 which abuts the outer end surface 12 of said head part when said comb is in its deployed position. In an alternative embodiment (not shown), screw adjustment means are incorporated into said stop arm to adjust the angle at which said comb is deployed. In an alternative embodiment (not shown), said lever arm and pivot arrangement is provided on both sides of said body part, both said finger bars and free ends of said lever arms being joined by suitable members. In this embodiment, said cable and drum arrangement is provided in single form, as described, or in duplicated form at both ends of said comb carrier. The ratio of lengths of the parts of said lever arm above and below said pivot are adjusted as required to produce the requisite displacement of the free end of said lever arm with depression of said finger bar. To permit the remote controlling of the operation of a vacuum cleaner associated with said appliance, proximity switch 31 is fixed to said body part in a position in which it is able to detect the rearward displacement of the free end of said lever arm. Cable 32 transmits signals from said proximity sensor to a power control unit (not shown) controlling the supply of electrical power to said vacuum cleaner. In the preferred embodiment, said power control unit is plugged into a reticulated electrical power socket and the electrical plug of said vacuum cleaner is plugged into an electrical power socket provided in said power control unit. Said vacuum cleaner is left switched on and signals from said proximity sensor trigger said power control unit to supply electrical current to said vacuum cleaner whenever said comb is in its retracted position. In the preferred embodiment, said proximity sensor is a Hall effect sensor detecting a small magnet at the free end of said lever arm. Also in the preferred embodiment, said power control unit is a solid-state unit based upon a silicon-controlled rectifier.

Figure 5:
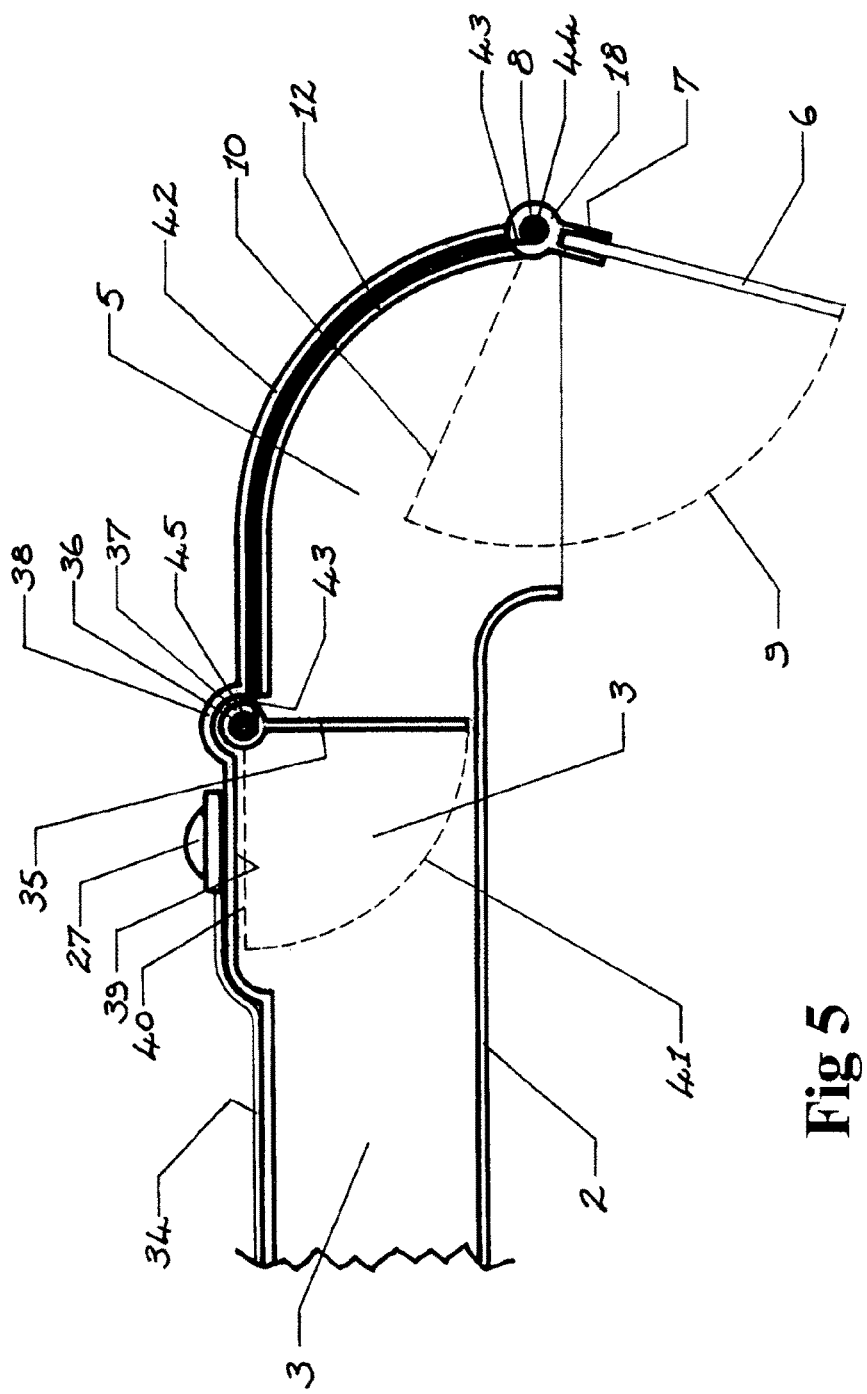
FIG. 5 is a longitudinal cross-sectional view of a third embodiment of the present invention.

With reference to FIG. 5, said appliance is made with mechanical means employed to automatically displace said comb into its retracted position when said Vacuum cleaner is operated. In this embodiment, suitable spring means are provided to displace said comb into its deployed position. Said body part defines airflow duct 3 having an internal cross-sectional shape which is substantially square or rectangular, vane 35 being pivotally supported from the roof of said airflow duct on shaft 36 passing through bore (not shown) in part-cylindrical pivot member 37. Suitable spring means are provided to urge said vane towards its rest position in which it substantially fills the cross-section of said airflow duct. Recess 39 is provided in the roof of said body part to accommodate said vane when it is displaced from its rest position via arc 41 (depicted in broken line) to the more or less horizontal position 40 (depicted in broken line). The roof of said body part is raised locally at 38 to accommodate pivot member 37. Cable 43 is wound around cable drum 45 formed on part cylindrical pivot member 37 and led through guide tube 42 fixed to the outer end surface 12 of said head part to cable drum 44 formed on part cylindrical pivot member 18. Activation of said vacuum cleaner causes displacement of said vane from its rest position to position 40 against the urging of said vane spring means. Displacement of said vane causes said cable to be increasingly wound onto cable drum 45 and, thereby, to be drawn through said guide tube, and to be wound off cable drum 44. The winding of said cable from cable drum 44 causes said comb carrier and said comb to be pivotally displaced via arc 9 into position 10 in said atrium against the urging of said comb spring means. Deactivation of said vacuum cleaner allows said vane spring means to restore said vane from position 40 to its rest position, the winding of said cable off cable drum 45 slackening said cable, permitting it to be drawn in the reverse direction through said guide tube and wound onto cable drum 44 as said comb spring means displace said comb from position 10 to its deployed position. The ratio of the diameters of cable drums 44 and 45 are adjusted as required to produce the requisite displacement of said comb in response to the displacement of said vane. In the preferred embodiment, said cable takes the form of a strong, smooth, braided, softly flexible cord made from aramid or similar material and said guide tube takes the form of a rigid tube of metal or polymer material with a smooth bore. Switch 27 and cable 34 are provided for the remote operation of said vacuum cleaner. A power control unit (not shown) is plugged into a reticulated electrical power socket and the electrical plug of said vacuum cleaner is plugged into an electrical power socket provided in said power control unit. Said vacuum cleaner is left switched on and signals from switch 27 trigger said power control unit to supply electrical current to said 0.25 vacuum cleaner. In the preferred embodiment, the signal from said switch is a low-voltage control signal. In an alternative embodiment, said switch controls a flow of current at mains supply voltage to said vacuum cleaner. In alternative embodiments (not shown), said proximity sensor optionally takes any suitable form, including that of a contact microswitch.

With reference to FIGS. 6, 7 and 8, said appliance is made with mechanical geared means employed to automatically displace said comb into its retracted position when said vacuum cleaner is operated. In this embodiment, suitable spring means are provided to displace said comb into its deployed position, said comb being supported in comb carrier 7 fixed to torque tube 50. Said torque tube is rotationally supported on shaft 48, one of its ends being free and the other passing out through bearing 51 formed in side wall 60 of said appliance head part. Situated coaxially with bearing 51 is annulus gear 54 of epicyclic gear mechanism 61, said annulus gear being formed on the exterior of side wall 60. Sun gear 57 of said gear mechanism is formed on the end of said torque tube. Said shaft is rotationally supported at its free end in bearing 49 formed in side wall 59 of said appliance head part. The other end of said shaft extends out through the end of said torque tube where it terminates in spider 55 of said gear mechanism. Said spider incorporates a plurality of equally-spaced stub shafts (not shown) arranged parallel to said shaft and upon which are rotationally supported planetary gears 56 of said gear mechanism. Said sun gear, planetary gears and fixed annulus gear are maintained in continuous mesh. Vane 46 is pivotally supported immediately inside working opening 4 on arms 52, 58, suitable spring means urging it into its rest position in which it substantially blocks said working opening. Arm 52 is fixed to and turns with shaft 48 while arm 58 is rotationally supported on the exterior of torque tube 50. Deflection of said vane by air flowing into said atrium through said working opening is transmitted by shaft 48 to spider 55 turning said planetary gears inside said annulus gear, the rotation of said planetary gears so generated being transmitted to said sun gear, thereby generating a rotation of said torque tube and a displacement of said comb. The teeth numbers of the various gears in said epicyclic gear mechanism are selected to produce a multiplication effect between the rotational input of shaft 48 and output via said torque tube 50. In the example depicted in FIG. 6, an angular displacement of said vane of 45 degrees from its rest position via arc 62 to displaced position 47 (both depicted in broken line) produces an angular displacement of said comb of 100 degrees via arc 9 to displaced position 10 (both depicted in broken line). In the preferred embodiment, switch means similar to those described in relation to FIG. 5 are provided for the remote controlling of said vacuum cleaner. A dust-tight cover is provided over said annulus gear to exclude dust and other foreign material from said epicyclic gear mechanism.

With reference to FIG. 9, said appliance is made with electrically-operated means employed to displace said comb into its retracted position. In this embodiment, an electrical actuator is provided on the outer end surface 12 of said head part. Said activator is preferably accommodated in housing 63 and works directly upon said comb carrier. In the preferred embodiment, bearing means (not shown) are accommodated in housings 65 formed on the lower, outer edges of said head part, said comb carrier being rotationally supported in said bearing means. Said actuator transmits motion to said comb carrier via a screw and pinion mechanism or a rack and pinion mechanism, said pinions being formed on said comb carrier. In the preferred embodiment, the operation of said electrical actuator and said vacuum cleaner is controlled by single switch means similar to those described in relation to FIG. 5. Also in the preferred embodiment, limit switches are provided to control the displacement of said comb carrier within predetermined limits.

With reference to FIGS. 1 and 10, said comb carrier is deleted and comb 6 is pivotally supported on the ends of shaft 8 which passes through the full length of the lower edge of the outer end surface 12 of said appliance head part. Tabs 66 formed on the upper corners of said comb are turned through 90 degrees and the ends of said shaft pass through suitable apertures provided in said tabs. In this embodiment, said comb is made interchangeable by withdrawing said shaft, removing one comb, replacing it with another, re-installing said shaft and securing it in place with a suitable clip or pin 113.

With reference to FIGS. 11 and 23, said appliance is made with mechanical means employed to manually displace said comb into its retracted position. In this embodiment, suitable spring means (not shown) are provided to displace said comb into its deployed position. Depression of finger bar 67 pivotally displaces lever arm 68 on pivot 69 causing operating link 70 to be drawn back through guide 73. Said operating link is joggled or cranked at point 72 to transition from body part 2 to the wider head part 75. From said guide, said operating link passes out through housing 74 positioned over the end of comb carrier 116. A pinion 118 is provided on the end of said comb carrier, its lower teeth 119 engaging rack 120 formed on the lower edge of a slot formed in said operating link. Displacement of said link by said lever arm causes rotation of said pinion and said comb carrier and, thereby, pivotal displacement of comb 6 into atrium 5 against the urging of said spring means. The passage of the upper surface of said slot over pinion 118 does not inhibit the rotary motion of said pinion. Releasing of said finger bar permits said spring means to restore said comb to its deployed position. To accommodate differential motion between the ends of lever arm 68 and operating link 70, pin 71 on the proximal end of said operating link engages a slot provided in the lower end of said lever arm.

In alternative embodiments of said appliance (not shown), in order to accommodate the grooming of large and small animals, said head part of said appliance is made in a variety of transverse widths in the range 25 millimeters to 400 millimeters and the width of said working opening (measured along the axis of said appliance) is made in a variety of widths in the range 5 millimeters to 150 millimeters.

In alternative embodiments of said appliance (not shown) spring means urging said comb towards its deployed or retracted positions are deleted and replaced by suitable spring means provided on said comb displacement mechanism for the same purpose.

With reference to FIGS. 12, 13 and 14, said appliance is made with a swivelling connection 76 in the form of a more or less cylindrical extension rotationally supported on the end of body part 2. Said swivelling connection is made such that its inner bore is a light sliding fit on the cylindrical exterior surface of said body part and is secured in place on said body part by retaining clip 79 accommodated in circumferential groove 77 formed in the exterior surface of said swivelling connection. In the preferred embodiment, said retaining clip is made from spring wire and is circular except for two or more inwardly deviating zones 80. Suitable apertures (not shown) are provided in the floor of circumferential groove 77 and said retaining clip inwardly deviating zones extend through said apertures to engage circumferential groove 78 formed in the exterior surface of said body part. Outer bore 84 of said swivelling connection is made tapered and accommodates adapter sleeve 81 made from a suitable elastomeric material. In the preferred embodiment, said adapter sleeve has an approximate hardness in the range 25 to 60 in the Durometer-A scale. The function of said adapter sleeve is to sealingly engage the end of a hose of a vacuum cleaner used in conjunction with said appliance and the making of a sealing connection is facilitated by the inner bore 85 of said adapter sleeve tape having a slight taper, increasing in diameter towards its open end. In order to accommodate vacuum cleaner hoses in a range of diameters, said adapter sleeve is made in a range of suitable internal diameters and is readily removed and replaced with another of larger or smaller internal diameter. Said adapter sleeve is secured in place in said swivelling connection outer bore by one or more bosses 82 formed on its exterior surface engaging suitably located, sized and shaped, complementary apertures 83 formed in said swivelling connection, flange 86 on the outer end of said adapter sleeve abutting the outer end of said swivelling connection. To improve the elastic compliance of said adapter sleeve during its engagement by the end of a said vacuum cleaner hose, a plurality of shallow, longitudinally-arranged grooves 87 are provided in the exterior surface of said adapter sleeve. In the preferred embodiment, said longitudinally-arranged grooves number between 10 and 20, have circumferential widths falling in the range 2% to 5% of the external circumference, have depths in the range 1 to 3 millimeters and are evenly spaced. With reference to FIG. 15, in order to reduce the sound level of a vacuum cleaner 89 necessarily employed in conjunction with the present invention, which sound level will be alarming to many pets, a sound attenuating enclosure is provided. Said enclosure comprises a solid base 88 to which are fixed the lower edges of two side walls 90 and two end walls 91, said walls being made contiguous around said base. A suitable aperture (not shown) is provided in one said end wall to provide egress of the hose 92 of said vacuum cleaner. Formed on the upper edges of said side walls are side flaps 93 and formed on the upper edges of said end walls are end flaps 94. A suitable creasing (not shown) is provided at the junctions of said side and end walls with said flaps to facilitate folding of said flaps. A pad 95 of a softly flexible, elastomeric foam material is provided to seal said vacuum cleaner hose to said end wall, an aperture in said pad being stretched to accommodate said hose and said pad being fixed to the interior surface of said end wall by means of hook and loop-type attachment material of the type sold under the brand name Velcro®. In the preferred embodiment, said base is made with vibration-absorbent under-supports to minimise transmission of sound and vibration to a supporting surface. Also in the preferred embodiment, the material of said side and end walls and their flaps is a suitable woven or felted material or laminated combination covered with an outer later of protective fabric, the nature of said material being such as to permit a free flow of air outwardly through it from the interior of said enclosure. Suitably located, longitudinally-arranged strips 96 of hook and loop-type attachment material of the type sold under the brand name Velcro® are provided along what becomes the underside of said side flaps when they are folded inwardly. With additional reference to FIG. 16, suitably located, longitudinally-arranged strips 97 of hook and loop-type attachment material of the type sold under the brand name Velcro® are provided along what becomes the upper side of said end flaps when they are folded inwardly, the positions of strips 96 being complementary to the positions of strips 97 when said side flaps and said end flaps are all folded inwardly. Also in the preferred embodiment, a plurality of suitably sized blocks of a softly flexible, elastomeric foam material is provided to be packed around said vacuum cleaner to positively locate it within said enclosure. With additional reference to FIG. 17, with said vacuum cleaner in place within said enclosure, said end flaps are first folded inwardly and said side flaps are then folded inwardly, said strips of hook and loop attachment material mutually engaging and retaining said flaps in close abutment. The ends of suitable lengths of strap 98 are fixed to the upper exterior sides of said enclosure at approximately the mid longitudinal length of said enclosure and are joined and tensioned by means of a suitable buckle or quick-release connector, said joined strap acting to restrain said flaps in their inwardly folded positions and to provide a handle for lifting purposes.

With reference to FIGS. 18 and 19, a comb carrier of the present invention comprises, principally, upper part 100 pivotally supported from said body part on a pivot pin (not shown) passing through apertures 104 in tabs 103 formed on the upper corners of said upper part and turned through 90 degrees. The lower part of said comb carrier is divided by slots 111 into three or more parts 101 and 102, said parts being joggled into parallel separation such as to pass to either side of the upper end 105 of a comb 106 urged between them. Said joggled parts are provided with rounded, inwardly directed projections 109, 110 which, when said comb upper part is fully entered between said joggled parts, engage suitable apertures 107, 108 provided in said comb upper part.

With reference to FIG. 20, in an alternative embodiment, tabs 103 are made longer and are provided with a bend 112 which extends through approximately 180 degrees, the extra length of said bend providing a degree of elastic compliance that reduces the possibility of fatigue cracking at the junction of said tabs with said comb carrier.

With reference again to FIG. 5, in an alternative embodiment of said appliance (not shown), suitable spring means are provided to urge said comb towards its deployed position. The cable and guide tube mechanism of FIG. 5 is employed, the distal end of said cable being wound around a cable drum formed on said comb carrier, a ring or other suitable handle being attached to the free end of said cable. Said ring or handle is positioned on the upper surface of the head part of appliance and, when said comb is required to be displaced to its retracted position, said cable is simply pulled, said comb returning to its deployed position when said cable is released.

With reference again to FIG. 1, in an alternative embodiment (not shown), the embodiment of FIG. 1 is made with suitable spring means (not shown) to displace comb 6 into its retracted position. During use of said appliance, said comb is maintained in its deployed position by the user applying thumb or finger pressure to stop bar 11. Releasing of said stop bar permits said spring means to displace said comb to its retracted position, said stop bar being simultaneously displaced forwardly and away from the outer end surface 12 of said head part. Said comb is restored to its deployed position by the user manually drawing back said stop bar into position against said outer end surface of said head part and retaining it there during use of said appliance by means of thumb or finger pressure.

With reference again to FIGS. 4, 5 and 11, in an alternative embodiment (not shown), suitable spring means (not shown) are provided to urge comb 6 towards its deployed position. Vane 35 of FIG. 5 is fixed to shaft 36 of FIG. 5, said shaft being rotationally supported in suitable bearings formed in the upper, side parts of said body part. Suitable spring means are optionally provided to urge said vane towards its rest position. One or more parallel levers are fixed to the ends of said shaft and connected at their free ends to the cable and guide tube mechanism of FIG. 4 or the operating link and rack and pinion mechanism of FIG. 11. In a first preferred embodiment, in order to ensure the correct displacement of said comb, the rest position of said vane is optionally displaced substantially from the vertical position depicted in FIG. 5. In a second preferred embodiment, said levers are made shorter and said cable and guide tube mechanism or said operating link and rack and pinion mechanism is shaped and positioned as required to be connected to the free ends of said levers. Displacement of said vane by airflow generated by said vacuum cleaner is transmitted via said shaft and said levers to said mechanisms, thereby displacing said comb into its retracted position.

With reference again to FIGS. 4 and 11, in alternative embodiments (not shown), the pivots of FIGS. 4 and 11 are optionally positioned on various parts of said body part such that said lever arms are optionally positioned substantially vertical, horizontal or angled forwardly, rearwardly or laterally; said finger bars are fixed to said lever arms in any position to facilitate their use to displace said lever arms; and said cable and guide tube mechanism or said operating link and rack and pinion mechanism is shaped and positioned as required to be connected to the free ends of said levers.

With reference again to FIG. 11, in an alternative embodiment (not shown), suitable spring means (not shown) are provided to urge comb 6 towards its deployed position. Said lever arm is deleted and the operating link of said operating link and rack and pinion mechanism is angled upwardly and rearwardly. Said operating link is cranked or joggled as required to bring its free end into a position immediately adjacent said body part and convenient to the thumb of a user of said appliance. A thumb-operated plunger formed on the free end of said operating link is pressed by the operator to displace said comb into its retracted position. Releasing of said plunger permits said spring means to restore said comb to its operating position. In this embodiment, the positioning of the rack of FIG. 11 is reversed to achieve correct motion of said comb when said plunger is pressed.

With reference again to FIGS. 4 and 11, in an alternative embodiment (not shown), suitable spring means (not shown) are provided to urge comb 6 towards its deployed position. Said lever arm is deleted and a sliding or pivoted trigger is connected to the free end of said cable of said cable and guide tube mechanism or the free end of the operating link of said operating link and rack and pinion mechanism. Said operating guide tube or said operating link is shaped and positioned as required to bring the free ends of said cable or said operating link into a position on said body part such that said trigger is able to be located in a position convenient to the fingers of a user of said appliance. Said trigger is pulled to displace said comb into its retracted position. Releasing of said trigger permits said spring means to restore said comb to its operating position.

With reference again to FIG. 1, in an alternative embodiment (not shown), suitable spring means (not shown) are provided to urge comb 6 towards its retracted position. Said stop arm is deleted and a suitable lever is fixed to an end of said comb carrier, said lever being joggled or cranked to bring its free end into a position immediately adjacent said body part and convenient to the fingers of a user of said appliance when said comb is in its deployed position. Said lever is held against the urging of said spring means in its position relating to the deployed position of said comb by means of a suitable spring latch. When said comb is required to be displaced to its retracted position, said latch is released and said lever is displaced forwardly by the movement of said comb under the influence of said spring means. Said comb is restored to its deployed position by the user manually displacing said lever rearwardly to be engaged again by said latch. Obviously, said spring means may optionally urge said comb towards its deployed position and a user of said appliance may displace said comb into its retracted position by displacing said lever forwardly against the urging of said spring means.

In an alternative embodiment (not shown), a suitable razor blade is clipped to said comb such that the edge of said blade is exposed between the teeth of said comb. In this embodiment, the hair of an animal being groomed may be cut by drawing said comb through the coat of the animal. In the preferred embodiment, suitable detents are provided in the sides of said comb to allow said razor blade to be raised or lowered on said comb, thereby allowing, where the teeth of said comb are made tapered, for a greater or lesser area of blade edge to be exposed.

With reference to FIG. 21, said comb takes the form of the comb of an electrically-operated clipper, a small, powerful electric motor 113 driving said clipper being mounted at the outer, upper edge of said comb and supplied with electrical current via an elastically coiled cable (not shown). Said electric motor moves with said comb and is displaced outwardly when said comb is displaced into its retracted position.

With reference to FIG. 22, in a second alternative embodiment, an electric motor 114 is mounted on said outer end surface of said appliance head part and drives said clipper by a finger driven in reciprocation by said motor engaging a complementary slot in the clipper moving part. Said finger disengages from said slot when said comb is displaced into its retracted position.

In an alternative embodiment (not shown), remote vacuum cleaner control is effected by a wireless connection to a power control unit of the type described in relation to FIG. 4. In the preferred embodiment, said appliance incorporates a battery-operated unit which transmits a coded signal to said power control unit when a control switch is pressed or when said comb is displaced into its retracted position.

In an alternative embodiment (not shown), a rotary grooming brush having bristles in a transversely arranged cylindrical array is rotationally supported on the forward, lower edge of said head part and driven in rotation by a suitable electric motor. During rotation of said brush, the teeth of said brush pass between the teeth of a suitable hair collection comb pivotally mounted on said head part. When a quantity of hair has accumulated on said comb, said comb is pivotally displaced into said atrium of said appliance to be removed by airflow generated by said vacuum cleaner. In a first preferred embodiment, said comb is pivotally supported on its edge from, the inner (rearward) edge of said working opening. In a second preferred embodiment, said comb is pivotally supported on a shaft positioned transversely at the mid width of said working opening, accumulated hair on said comb being removed by pivoting said comb on said shaft to such that it is aligned parallel to the airflow entering said working opening with the teeth of said comb positioned inwardly.

In alternative embodiments (not shown), in any of the embodiments described, said comb is pivotally supported on a shaft positioned transversely at the mid width of said working opening, instead of being pivotally supported at one edge.

With reference again to FIG. 1, in an alternative embodiment (not shown), a proximity sensor, microswitch or the like is provided in a suitable internal or external position adjacent an edge of said working opening, said sensor or microswitch being actuated by deployment of said comb carrier or said comb to its said retracted position. Said sensor or microswitch is connected by suitable conductors or radio frequency means to a said power control unit which supplies power to and activates said vacuum cleaner whenever said comb carrier or said comb is in its said retracted position.

In all embodiments of said appliance, the open end of said airflow duct is made with an adaptor able to be readily connected to the end fitting of any common form of vacuum cleaner hose. In a first preferred embodiment, said fitting takes the form of a collar of a soft, rubbery polymer material within which the end fitting of a vacuum cleaner hose may be frictionally and sealingly captured. In a second preferred embodiment, said fitting takes the form of a male fitting of a suitable rigid material and of a diameter permitting it to be frictionally and sealingly captured in the end fitting of a vacuum cleaner hose.

The invention claimed is:

1. An appliance for grooming furred animals comprising:
   a head part comprising an opening;
   a comb attached to a shaft at a distal edge of the opening of the head part and deployable through a rotation of the shaft about an axis between a first position, in which the comb extends outside the head part and is able to engage the coat of an animal to be groomed, and a second position, in which the comb is retracted into the head part, wherein in the second position accumulated fur or hair is positively detached from said comb and swept away by airflow passing through said appliance; and
   a stop arm having a first end attached to the shaft and a weighted free end, the stop arm positioned outside the head part and the opening and having a fixed position relative to the comb, wherein inertia of the stop arm drives movement of said comb between the first and second positions relative to the head part in response to a flicking movement of the appliance by a user;
   wherein:
      said head part being formed on a distal end of a tubular handle part and of a shape and size to accommodate said comb, a proximal end of said handle part being connectable to a vacuum cleaner; and
      wherein the stop arm rotates with the shaft about the axis relative to the head part between the first and second positions.

2. The appliance of claim 1, wherein said stop arm passes around and is shaped to conform to the shape of an outer end surface of said head part, an outer surface of the free end of said stop arm supporting a suitable weight, and an inner surface of the free end of said stop arm includes a snubber made from a suitable resilient material, forces applied to said comb during grooming being transmitted via said stop arm to said snubber bearing against the outer end surface of said head part.

3. The appliance of claim 1, wherein said comb is removably fixed to a comb carrier pivotally supported on a shaft at the distal edge of the opening of said head part of said appliance, said stop arm being fixed to said comb carrier.

4. The appliance of claim 3, wherein said comb is made interchangeable, its upper edge being made with suitable apertures or recesses which engage complementary projections provided within a channel of said comb carrier defined by two parallel parts when said comb upper edge is seated in said comb carrier, the two parallel parts of said comb carrier being made sufficiently elastic to allow them to spring apart when said comb upper edge is forced between them.

5. The appliance of claim 3, wherein said comb carrier is formed on one or more movable and part-cylindrical pivot members which are disposed between one or more fixed and part-cylindrical pivot members formed on the lower edge of outer end surface of said head part, said movable pivot members being pivotally supported on a shaft passing through their bores and fixed in complementary bores in said fixed pivot members.

6. The appliance of claim 3, wherein:
the appliance includes an epicyclic gear mechanism configured to automatically displace said comb into said second (retracted) position when said vacuum cleaner is operated;
the appliance includes a spring configured to urge said comb towards its said first (deployed) position;
said comb being supported in said comb carrier which is fixed to a torque tube, said torque tube being rotationally supported on a shaft having first and second ends, the first end being free and the second end passing out through a first bearing formed in a first said side wall of said appliance head part;
the gear mechanism includes an annulus gear being formed coaxially with said first bearing on the exterior of said first side wall, and a sun gear formed on an end of said torque tube;
the first end of said shaft being rotationally supported in a second bearing formed in a second side wall of said appliance head part, the second end of said shaft extending out through the end of said torque tube where it terminates in a spider of said gear mechanism, said spider incorporating a plurality of equally-spaced stub shafts arranged parallel to said shaft and upon which are rotationally supported planetary gears of said gear mechanism, said sun gear, planetary gears and fixed annulus gear being maintained in continuous mesh;
a vane is pivotally supported immediately inside said working opening on a pair of arms, one of which is fixed to and turns with said shaft while the other turns freely on the exterior of said torque tube;
a spring urges said vane towards a rest position, in which it substantially blocks said working opening;
deflection of said vane by air flowing into an atrium of the head part through said working opening being transmitted by said shaft to said spider to turn said planetary gears inside said annulus gear, the rotation of said planetary gears so generated being transmitted to said sun gear, thereby generating a rotation of said torque tube and a displacement of said comb; and
the teeth numbers of the various gears in said epicyclic gear mechanism being selected to produce a multiplication effect between the rotational input of said shaft and output via said torque tube.

7. The appliance of claim 1, wherein said comb and stop arm are joined and pivotally supported on the ends of a shaft passing through the full length of the lower edge of the outer end surface of said appliance head part, tabs formed on the upper corners of said comb being turned through 90 degrees, the ends of said shaft passing through suitable apertures provided in said tabs; said comb being made interchangeable by withdrawing said shaft, removing one comb, replacing it with another, re-installing said shaft and securing it in place with a suitable clip or pin.

8. The appliance of claim 3, wherein:
the appliance includes deployment mechanism configured to displace said comb into the second (retracted) position, and a spring configured to urge said comb towards said first (deployed) position;
the appliance includes a finger bar, the depression of which pivotally displaces a lever arm that is pivotally-supported on said handle part to cause an operating link to be drawn back through a guide fixed to said head part, said operating link being joggled or cranked to transition from said handle part to said head part;
said operating link passing out through a housing positioned over an end of said comb carrier, a rack formed on said operating link engaging lower teeth of a pinion provided on the end of said comb carrier;
displacement of said link by said lever arm causing rotation of said comb carrier and, thereby, pivotal displacement of said comb into an atrium of the head part against the urging of said spring means;
release of said finger bar permitting the urging of said spring to restore said comb to said second (deployed) position; and
differential motion between a distal end of said lever arm and said operating link being accommodated by a pin on a proximal end of said operating link engaging a slot provided in a lower end of said lever arm.

9. The appliance of claim 1, wherein the appliance includes a swiveling connection including a cylindrical extension rotationally supported on a proximal end of said handle part, said swiveling connection including an inner bore having a light sliding fit on a cylindrical exterior surface of the proximal end of said handle part and is secured in place on said handle part by a retaining clip accommodated in a circumferential groove formed in the exterior surface of said cylindrical extension, said retaining clip being made from spring wire and having a circular shape except for two or more inwardly-deviating zones, a floor of said circumferential groove including apertures that permit said inwardly-deviating zones of said retaining clip to extend through said apertures to engage a circumferential groove formed in the exterior surface of the proximal end of said handle part.

10. The appliance of claim 1, wherein:
the appliance includes a sound attenuating enclosure comprising a solid base to which are fixed lower edges of two side walls and two end walls, said walls being joined and made contiguous around said base, one of the end walls including an aperture configured to provide egress of the hose of said vacuum cleaner; side flaps being formed on upper edges of said side walls and end flaps being formed on upper edges of said end walls, junctions of said side and end walls with said flaps are creased to facilitate folding of said flaps;
the appliance includes a pad of a softly flexible, elastomeric foam material fixed to an interior surface of the end wall including the aperture with a hook and loop-type, releasable attachment material, the pad including an aperture through which the hose extends;
said base being including vibration-absorbent under- supports to minimize transmission of sound and vibration to a supporting surface, the material of said side and end walls and the flaps being a woven or felted material or a laminated combination covered with an outer layer of protective fabric, the material being configured to permit a free flow of air outwardly through it from the interior of said enclosure;
longitudinally-arranged strips of said hook and loop-type attachment material are attached to what becomes an underside of said side flaps when they are folded inwardly, and longitudinally-arranged strips of hook and loop-type attachment material are attached to what becomes an upper side of said end flaps when they are folded inwardly, the positions of said strips of hook and loop-type attachment material being complementary and such that opposing strips engage when said side flaps and said end flaps are all folded inwardly; a plurality of blocks of a softly flexible, elastomeric foam material packed around said vacuum cleaner to positively position the vacuum cleaner within said enclosure.

11. The appliance of claim 3, wherein said comb carrier comprises an upper part pivotally supported from said handle part on a pivot pin passing through apertures in tabs formed on upper corners of said upper part and turned through 90 degrees, a lower part of said comb carrier being divided by slots into three or more parts, said upper and lower parts being joggled into parallel separation such as to pass to either side of an upper end of a comb urged between them, said joggled parts being provided with rounded, inwardly directed projections which, when said comb upper end is fully entered between said joggled parts, engage suitable apertures provided in said comb upper end.

12. The appliance of claim 1, wherein a spring is provided to urge said comb into said second (retracted) position, during use of said appliance, said comb being maintained in its said first (deployed) position by the user applying thumb or finger pressure to said stop arm, releasing of said stop arm permitting said spring to displace said comb to its said second (retracted) position with said stop arm being simultaneously displaced forwardly and away from the outer end surface of said head part, said comb being restored to its said first (deployed) position by the user manually drawing back said stop arm into position against said outer end surface of said head part and retaining it there during further use of said appliance by means of thumb or finger pressure.

13. The appliance of claim 3, wherein a spring is provided to urge said comb towards said second (retracted) position, a suitable lever being fixed to an end of said comb carrier, said lever being joggled or cranked to bring a free end of the lever into a position immediately adjacent said handle part and convenient to fingers of a user of said appliance when said comb is in its first (deployed) position, said lever being held against the urging of said spring in its position relating to said deployed position of said comb by means of a spring latch, said spring latch being released when said comb is required to be displaced to said second (retracted) position, said lever being displaced forwardly by the movement of said comb under the influence of said spring; said comb being restored to said first (deployed) position by the user of said appliance manually displacing said lever rearwardly to be re-engaged by said latch.

14. The appliance of claim 1, wherein a suitable razor blade is clipped to said comb such that the edge of said blade is exposed between teeth of said comb, the hair of an animal being groomed being cut by drawing said comb through the coat of the animal; suitable detents are provided in the sides of said comb to allow said razor blade to be raised or lowered on said comb, thereby allowing, where the teeth of said comb are made tapered, for a greater or lesser area of blade edge to be exposed.

15. The appliance of claim 1 comprising an electrically-operated clipper including , a small, powerful electric motor driving said clipper, said clipper being mounted at an outer, upper edge of said comb and supplied with electrical current via an elastically coiled cable; said electric motor moving with said comb and being displaced outwardly when said comb is displaced into said second (retracted) position.

16. The appliance of claim 1, wherein a remote vacuum cleaner is activated by means of a wireless connection between an On/Off control on said handle part and a power control unit plugged into a reticulated electrical power socket, an electrical plug of said vacuum cleaner being plugged into an electrical power socket provided in said power control unit, an On/Off control switch of said vacuum cleaner being left switched on and signals from said appliance On/Off control triggering said power control unit to supply electrical current to said vacuum cleaner.

17. The appliance of claim 3, wherein a proximity sensor or a microswitch is provided adjacent an edge of said opening of the head part, said sensor or microswitch being actuated by deployment of said comb carrier or said comb to said second (retracted) position, said sensor or microswitch being connected by a wired or wireless connection to a power control unit which supplies power to and activates said vacuum cleaner whenever said comb carrier or said comb is in its said retracted position.

18. A method of grooming furred animals comprising:
drawing through the furred parts a comb attached to a shaft at a distal edge of an opening of a head part of an appliance and deployable between a first position, in which the comb extends outside the head part and is able to engage the coat of an animal to be groomed, and a second position, in which the comb is retracted into the head part of said appliance, in which accumulated fur or hair is positively detached from said comb and swept away by airflow passing through said appliance, wherein said head part being formed on the distal end of a tubular handle part and of a shape and size to accommodate said comb, a proximal end of said handle part being connected to a vacuum cleaner, and the appliance includes a stop arm having a first end attached to the shaft and a weighted free end, the stop arm positioned outside the head part and the opening and having a fixed position relative to the shaft and the comb;
displacing said comb between said first and second positions comprising flicking said appliance, wherein inertia of the stop arm drives rotational movement of said shaft and the stop arm about an axis of the shaft relative to the head part, and drives the comb between the first and second positions relative to the head part, in response to the flicking of the appliance.

19. The method of claim 18 further comprising reducing a sound level of said vacuum cleaner using a sound attenuating enclosure comprising a solid base to which are fixed lower edges of two side walls and two end walls, said walls being joined and made contiguous around said base, an aperture being provided in one of said end walls to provide egress of a hose of said vacuum cleaner; side flaps being formed on upper edges of said side walls and end flaps being formed on upper edges of said end walls, suitable creasing being provided at junctions of said side and end walls with said flaps to facilitate folding of said flaps, a pad of a softly flexible, elastomeric foam material being provided to seal said vacuum cleaner hose to said end wall having the aperture, an aperture in said pad being stretched to accommodate said hose and said pad being fixed to an interior surface of said end wall by means of hook and loop-type, releasable attachment material; said base including vibration-absorbent under supports to minimize transmission of sound and vibration to a supporting surface, the material of said side and end walls and their flaps including a woven or felted material or a laminated combination covered with an outer layer of protective fabric, the material being configured to permit a free flow of air outwardly through said material from the interior of said enclosure; longitudinally-arranged strips of hook and loop-type attachment material are attached to what becomes an underside of said side flaps when they are folded inwardly and longitudinally-arranged strips of hook and loop-type attachment material are attached to what becomes an upper side of said end flaps when they are folded inwardly, the positions of said strips of hook and loop-type attachment material being complementary and such that opposing strips engage when said side flaps and said end flaps are all folded inwardly; a plurality of suitably sized blocks of a softly flexible, elastomeric foam material packed around said vacuum cleaner to positively position the vacuum cleaner within said enclosure.

20. The method of claim 19, wherein, with said vacuum cleaner in place within said enclosure, said end flaps are first folded inwardly and said side flaps are then folded inwardly, said strips of hook and loop attachment material mutually engaging and retaining said flaps in close abutment, ends of suitable lengths of strap are fixed to upper exterior sides of said enclosure at approximately a mid longitudinal length of said enclosure being joined and tensioned by means of a suitable buckle or quick-release connector, said joined strap acting to restrain said flaps in their inwardly folded positions and to provide a handle for lifting purposes.

21. The method of claim 18 wherein flicking said appliance comprises sharply moving said appliance downwards in a short arc such that centrifugal force throws said stop arm outwardly to displace said comb to the second position, said outward displacement of said stop arm being limited by the displaced said comb carrier abutting the lower edge of said head part.

22. An appliance for grooming furred animals comprising:
    a head part comprising an opening; and
    a comb attached to a shaft positioned transversely at a mid width of said opening of the head part and deployable through a rotation of the shaft about an axis between a first position, in which the comb extends outside the head part and is able to engage the coat of an animal to be groomed, and a second position, in which the comb is retracted into the head part, wherein in the second position accumulated fur or hair is detached from said comb and swept away by an airflow passing through said appliance; and
    a stop arm having a first end attached to the shaft and a weighted free end, the stop arm positioned outside the head part and the opening and having a fixed position relative to the comb and the shaft, wherein the stop arm rotates about the axis relative to the head part with rotation of the shaft, and inertia of the stop arm drives movement of said comb between the first and second positions relative to the head part in response to a flicking movement of the appliance by a user;
    wherein said head part being formed on a distal end of a tubular handle part and of a shape and size to accommodate said comb, a proximal end of said handle part being connectable to a vacuum cleaner.

23. The appliance of claim 1, further comprising a swiveling connection on the proximal end of said handle part.

* * * * *